United States Patent
Ikemura et al.

(10) Patent No.: US 10,563,738 B2
(45) Date of Patent: Feb. 18, 2020

(54) VEHICULAR AUTOMATIC TRANSMISSION

(71) Applicant: TOYOTA JIDOSHA KABUSHIKI KAISHA, Toyota-shi, Aichi-ken (JP)

(72) Inventors: Masashi Ikemura, Toyota (JP); Hirofumi Ota, Toyota (JP); Yasuyuki Hagino, Toyota (JP); Mitsuhiro Toyoda, Miyoshi (JP); Yosuke Michikoshi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 15/359,221

(22) Filed: Nov. 22, 2016

(65) Prior Publication Data

US 2017/0152921 A1 Jun. 1, 2017

(30) Foreign Application Priority Data

Nov. 26, 2015 (JP) ................................ 2015-231101

(51) Int. Cl.
  *F16H 57/00* (2012.01)
  *F16H 3/66* (2006.01)

(52) U.S. Cl.
  CPC ............. *F16H 3/666* (2013.01); *F16H 3/663* (2013.01); *F16H 57/0006* (2013.01);
  (Continued)

(58) Field of Classification Search
  CPC ............... F16H 3/666; F16H 2200/006; F16H 2200/201; F16H 2200/2046;
  (Continued)

(56) References Cited

U.S. PATENT DOCUMENTS 5,052,535 A * 10/1991 Vandervoort ........... F16D 11/10
                                                     192/69.91
8,360,927 B2    1/2013 Murata et al.
(Continued)

FOREIGN PATENT DOCUMENTS

JP    H06-59653 U    8/1994
JP    2003-139157 A  5/2003
(Continued)

OTHER PUBLICATIONS

Partial Translation of Nov. 29, 2017 Office Action issued in Russian Patent Application No. 2016146141.

*Primary Examiner* — Jeffrey A Shapiro
(74) *Attorney, Agent, or Firm* — Oliff PLC (57) ABSTRACT

A vehicular automatic transmission includes a plurality of engagement devices and a plurality of planetary gear sets. Each of the planetary gear sets includes rotating elements. At least one of the rotating elements of one of the plurality of planetary gear sets is coupled to one of the rotating elements of another planetary gear set or one of the engagement devices, via a spline engagement portion. The rotating elements other than the at least one of the rotating elements coupled via the spline engagement portion is coupled to another rotating element or a non-rotary member directly or via one of the engagement devices. The at least one of the rotating elements coupled via the spline engagement portion is configured to be co-rotated with no torque transmitted via the spline engagement portion, when the automatic transmission is placed in a predetermined gear position as one of the plurality of gear positions.

1 Claim, 6 Drawing Sheets (52) U.S. Cl.
CPC .. *F16H 2200/006* (2013.01); *F16H 2200/201* (2013.01); *F16H 2200/2046* (2013.01); *F16H 2200/2066* (2013.01); *F16H 2200/2082* (2013.01)

(58) Field of Classification Search
CPC ..... F16H 2200/2066; F16H 2200/2082; F16H 1/2863; F16H 57/12; F16H 57/00; F16H 57/0006; F16H 61/66; F16H 3/724; F16H 3/725; F16H 3/727; F16H 3/728; F16H 2061/6603; F16H 2200/2005; F16D 1/0835; F16D 7/021; F16D 7/02; F16D 2001/062; F16C 27/02; F16C 2370/12; F16C 35/02; G11B 5/4813
USPC ........ 384/535, 581; 360/97.02, 265.2, 265.6, 360/266.1; 403/367, 371, 372; 475/269; 192/30 V
See application file for complete search history.

(56) References Cited

U.S. PATENT DOCUMENTS

| | | | |
|---|---|---|---|
| 2005/0252327 A1* | 11/2005 | Shogren | F16D 1/0858 74/431 |
| 2006/0089228 A1* | 4/2006 | Nakagawa | F16H 57/082 475/286 |
| 2007/0149346 A1 | 6/2007 | Onishi et al. | |
| 2011/0308343 A1* | 12/2011 | Nakamura | F16H 3/006 74/331 |
| 2012/0048062 A1* | 3/2012 | Kokubo | F16D 13/683 74/665 F |
| 2013/0105267 A1* | 5/2013 | Nakamura | F16D 1/0835 192/56.1 |
| 2013/0244831 A1* | 9/2013 | Hiasa | F16H 61/04 477/79 |
| 2014/0206498 A1* | 7/2014 | Harada | F16H 57/082 475/331 |
| 2015/0082929 A1 | 3/2015 | Isomura | |
| 2015/0300490 A1* | 10/2015 | Iwasaki | F16H 63/3026 475/146 |
| 2016/0138683 A1 | 5/2016 | Kato et al. | |
| 2016/0281839 A1* | 9/2016 | Torii | F16H 57/082 |

FOREIGN PATENT DOCUMENTS

| | | |
|---|---|---|
| JP | 2003-287042 A | 10/2003 |
| JP | 2006-283955 A | 10/2006 |
| JP | 2007-177961 A | 7/2007 |
| JP | 2010-106968 A | 5/2010 |
| JP | 2015-064040 A | 4/2015 |
| JP | 2015-064099 A | 4/2015 |
| RU | 2177416 C1 | 12/2001 |
| RU | 2313020 C2 | 12/2007 |

\* cited by examiner

LOW ENGINE SPEED REGION

FIG. 8B

HIGH ENGINE SPEED REGION

FIG. 9

VEHICULAR AUTOMATIC TRANSMISSION

INCORPORATION BY REFERENCE

The disclosure of Japanese Patent Application No. 2015-231101 filed on Nov. 26, 2015 including the specification, drawings and abstract is incorporated herein by reference in its entirety.

BACKGROUND

1. Technical Field

The present disclosure relates to a vehicular automatic transmission, and is particularly concerned with a technology for suppressing torque fluctuation delivered from an output shaft of the vehicular automatic transmission.

2. Description of Related Art

A vehicular automatic transmission is known which consists of a plurality of planetary gear sets and a plurality of engagement devices, and is shifted to one of a plurality of gear positions when a selected one(s) of the engagement devices is switched between an engaged state and a released state. In the vehicular automatic transmission, some technologies for preventing torque fluctuation of an engine from being delivered to an output shaft of the automatic transmission have been proposed. For example, in Japanese Patent Application Publication No. 2006-283955 (JP 2006-283955 A), an inertia member is disposed in the vicinity of a rotating body in an automatic transmission, such that the rotating body and the inertia member can be engaged with each other by magnetic force. Accordingly, it is possible to change the inertia of the automatic transmission, by engaging the rotating body and the inertia member with each other. Thus, the torque fluctuation of the engine can be damped in the automatic transmission, by increasing the inertia of the automatic transmission against the torque fluctuation of the engine.

SUMMARY

As described in JP 2006-283955 A, torque fluctuation delivered from the output shaft of the automatic transmission is suppressed or reduced by making it possible to change the inertia in the vehicular automatic transmission. However, separately providing the inertia member may result in increase of the mass of the automatic transmission, and the transmission efficiency of the automatic transmission may be reduced. Also, a device or arrangement for engaging the inertia member with the rotating body is needed, resulting in increase of the manufacturing cost.

This present disclosure provides a vehicular automatic transmission including a plurality of planetary gear sets and a plurality of engagement devices, wherein torque fluctuation delivered from the vehicular automatic transmission can be suppressed, without significantly increasing the number of components.

A vehicular automatic transmission according to one aspect of the present disclosure includes a plurality of engagement devices and a plurality of planetary gear sets. The plurality of engagement devices is configured to realize a plurality of gear positions of the vehicular automatic transmission, according to a combination of engaged and released states of the plurality of engagement devices. Each of the planetary gear sets includes rotating elements. At least one of the rotating elements of one of the plurality of planetary gear sets is coupled to one of the rotating elements of another planetary gear set or one of the engagement devices, via a spline engagement portion. Each of the rotating elements other than the at least one of the rotating elements coupled via the spline engagement portion being coupled to another rotating element or a non-rotary member directly or via one of the engagement devices. The at least one of the rotating elements coupled via the spline engagement portion is configured to be co-rotated with no torque transmitted via the spline engagement portion, when the automatic transmission is placed in a predetermined gear position as one of the plurality of gear positions.

With the vehicular automatic transmission configured according to the above aspect of the present disclosure, when a predetermined gear position is established, the above-indicated at least one rotating element, to which no torque is transmitted, is co-rotated by another rotating element. At this time, the at least one rotating element, which is coupled via the spline engagement portion, rotates while colliding with spline teeth defining backlash formed in the rotating direction in the spline engagement portion. In a region in which the engine speed is low, the varying displacement of the spline engagement portion due to torque fluctuation of the engine is large; therefore, collisions are repeated in the spline engagement portion. Owing to the collisions, the energy of inertia due to torque fluctuation of the engine is consumed, and torque fluctuation delivered from the output shaft of the automatic transmission can be suppressed. Also, in order to suppress torque fluctuation, there is no need to add a new component, such as an inertia member, for suppressing the torque fluctuation.

In the vehicular automatic transmission according to the above aspect of the present disclosure, the above-indicated the vehicular automatic transmission may further includes a tolerance ring. The at least one rotating element coupled via the spline engagement portion may overlap a part of one of the other rotating element and the engagement device, as viewed in a radial direction of the vehicular automatic transmission. The tolerance ring may be mounted in a portion different from the spline engagement portion, such that the tolerance ring is in contact with the at least one rotating element coupled via the spline engagement portion, and a part of one of the other rotating element and the engagement device.

With the vehicular automatic transmission configured as described above, as the rotational speed of the engine increases, the varying displacement of the spline engagement portion is reduced, and collisions are less likely to occur in the spline engagement portion; therefore, the effect of cancelling torque fluctuation by use of the collisions is reduced. On the other hand, when the tolerance ring is provided between the above-indicated at least one rotating element, and a part of the rotating element of the other planetary gear set or the engagement device, backlash in the spline engagement portion is substantially eliminated. Accordingly, backlash formed on the power transmission path consists solely of backlash formed at meshing parts of gears, or the like, other than the spline engagement portion; therefore, the backlash is sufficiently reduced. As a result, the frequency of collisions between tooth faces defining backlash increases even after the engine speed increases, and the torque fluctuation can be suppressed, through consumption of the energy of inertia due to the collisions.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

One embodiment of the present disclosure will be described in detail with reference to the drawings. In the following embodiment, some components or parts in the drawings are simplified or deformed as needed, and the dimension ratios, shapes, etc. of the respective components or parts are not necessarily accurate.

Figure 1:
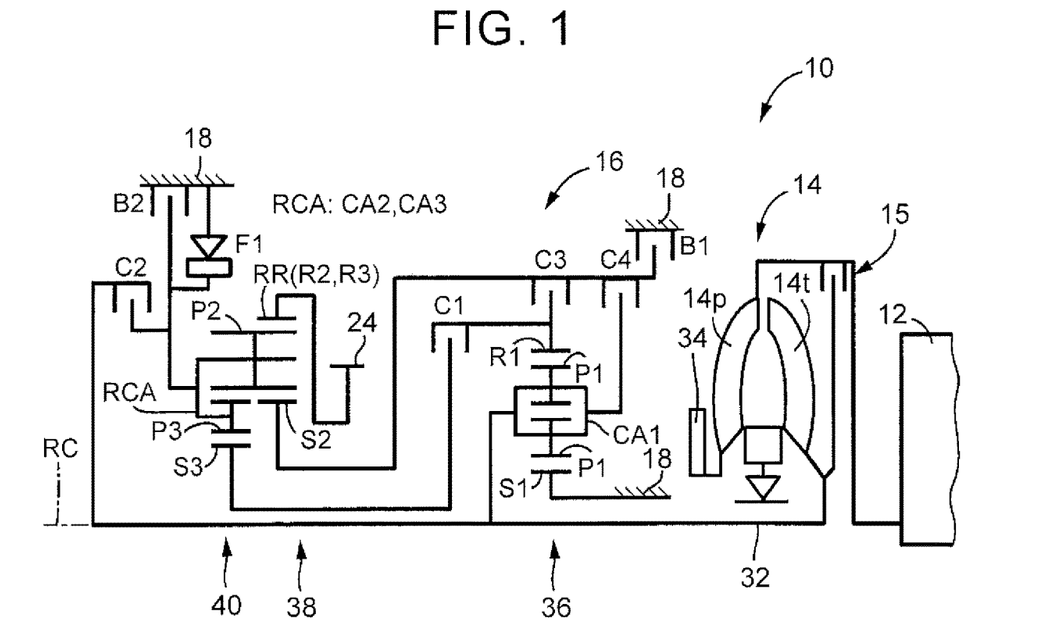
FIG. 1 is a skeleton diagram of a vehicular drive train to which the present disclosure is applied.

FIG. 1 is a skeleton diagram of a vehicular drive train 10 to which this present disclosure is applied. The vehicular drive train 10 includes an engine 12, a torque converter 14, and an automatic transmission 16. The torque converter 14 and the automatic transmission 16 are constructed generally symmetrically with respect to a center line (axis RC), and the lower half of each device below the center line is not depicted in FIG. 1. The axis RC in FIG. 1 is the axis of rotation of the engine 12, torque converter 14, and the automatic transmission 16.

In FIG. 1, the torque converter 14 is arranged to rotate about the axis RC, and includes a pump impeller 14$p$ coupled to the engine 12, and a turbine wheel 14$t$ coupled to a transmission input shaft 32 as an input rotary member of the automatic transmission 16. A mechanical oil pump 34 is coupled to the pump impeller 14$p$. The oil pump 34 generates hydraulic pressure for controlling gear shifting of the automatic transmission 16, and supplying lubricating oil to each part of a power transmission path of the automatic transmission 16, for example. The torque converter 14 is provided with a lockup clutch 15 for directly coupling the pump impeller 14$p$ with the turbine wheel 14$t$.

The automatic transmission 16 is a planetary gear type multi-speed transmission that provides a part of the power transmission path from the engine 12 to drive wheels (not shown), and functions as an automatic transmission having two or more gear positions. In the automatic transmission 16, selected ones of a plurality of friction engagement devices (first clutch C1-fourth clutch C4, first brake B1, and second brake B2) and a one-way clutch F1 are engaged, so that a plurality of gear positions (shift positions) having different gear ratios (speed ratios) are formed. For example, the automatic transmission 16 is a multi-speed transmission that performs so-called clutch-to-clutch shifting often used in known vehicles. The automatic transmission 16 has a double-pinion-type first planetary gear set 36, and a single-pinion-type second planetary gear set 38 and a double-pinion-type third planetary gear set 40, which are constructed as a Ravigneaux type gear unit, on the same axis (on the axis RC). The automatic transmission 16 is operable to change the speed of rotation of the transmission input shaft 32, and deliver the resulting rotary power from a transmission output shaft 24. The first clutch C1-fourth clutch C4, first brake B1, second brake B2, and the one-way clutch F1 correspond to engagement devices of the present disclosure.

The first planetary gear set 36 has a first sun gear S1 as an external-tooth gear, a first ring gear R1 as an internal-tooth gear disposed concentrically with the first sun gear S1, first pinion gears P1 each consisting of a pair of gears that mesh with the first sun gear S1 and the first ring gear R1, and a first carrier CA1 that supports the first pinion gears P1 such that the pinion gears P1 can rotate about themselves and rotate about the axis RC. The first sun gear S1, first carrier CA1, and the first ring gear R1 correspond to rotating elements of one of the planetary gear sets of the present disclosure.

The second planetary gear set 38 has a second sun gear S2 as an external-tooth gear, a second ring gear R2 as an internal-tooth gear disposed concentrically with the second sun gear S2, second pinion gears P2 that mesh with the second sun gear S2 and the second ring gear R2, and a second carrier CA2 that supports the second pinion gears P2 such that the pinion gears P2 can rotate about themselves and rotate about the axis RC. The second sun gear S2, second carrier C2, and the second ring gear R2 correspond to rotating element of one of the planetary gear sets of the present disclosure.

The third planetary gear set 40 has a third sun gear S3 as an external-tooth gear, a third ring gear R3 as an internal-tooth gear disposed concentrically with the third sun gear S3, and third pinion gears P3 each consisting of a pair of gears that mesh with the third sun gear S3 and the third ring gear R3, and a third carrier CA3 that supports the third pinion gears P3 such that the pinion gears P3 can rotate about themselves and rotate about the axis RC. The third sun gear S3, third carrier CA3, and the third ring gear R3 correspond to rotating elements of one of the planetary gear sets of the present disclosure.

In this embodiment, the second carrier CA2 of the second planetary gear set 38 and the third carrier CA3 of the third planetary gear set 40 are constituted a common member, and the second ring gear R2 of the second planetary gear set 38 and the third ring gear R3 of the third planetary gear set 40 are constituted by a common member. Further, each second pinion gear P2 of the second planetary gear set 38 functions as one of the pair of gears that constitute each third pinion gear P3 of the third planetary gear set 40, so that the second and third planetary gear sets 38, 40 cooperate to provide a so-called Ravigneaux type gear train. In the following description, the second carrier CA2 and the third carrier CA3 will be denoted as "carrier RCA" as a common member, and the second ring gear R2 and the third ring gear R3 will be denoted as "ring gear RR" as a common member. The carrier RCA and the ring gear RR correspond to rotating elements of the planetary gear sets of the present disclosure.

The first sun gear S1 is coupled to a case 18 as a non-rotary member. The first carrier CA1 is coupled to the transmission input shaft 32, and is also coupled to the second sun gear S2 via a fourth clutch C4. The first ring gear R1 is coupled to the third sun gear S3 via a first clutch C1, and is also coupled to the second sun gear S2 via a third clutch C3. The second sun gear S2 is coupled to the case 18 via a first brake B1. The carrier RCA is coupled to the transmission input shaft 32 via a second clutch C2, and is also coupled to the case 18 via a second brake B2. The carrier RCA is coupled to the case 18, via the one-way clutch F1 provided in parallel with the second brake B2. The ring gear RR is coupled to the transmission output shaft 24.

The above-mentioned first clutch C1, second clutch C2, third clutch C3, fourth clutch C4, first brake B1, and second brake B2 (which will be simply called "clutch C", "brake B", or "engagement device", when they are not particularly distinguished) are hydraulic friction engagement devices often used in known vehicular automatic transmissions, and are in the form of wet multiple-disc clutches and brakes adapted to be pressed by hydraulic actuators, or band brakes adapted to be tightened by hydraulic actuators. Each of the thus constructed clutches C and brakes B is switched between an engaged state and a released state, when its torque capacity (i.e., engaging force) is changed by a hydraulic control circuit (not shown) provided in the automatic transmission 16.

Figure 2:
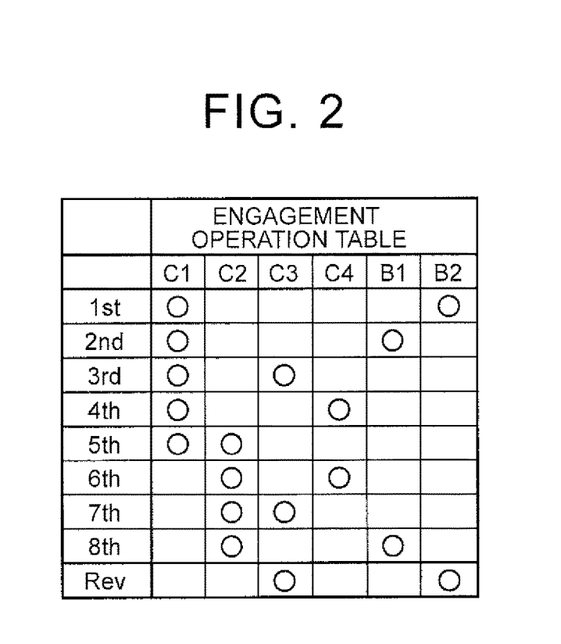
FIG. 2 is an engagement operation table of a vehicular automatic transmission of FIG. 1.

By controlling engagement and release of the clutches C and brakes B, each gear position of eight forward speeds and one reverse speed is formed according to the driver's accelerating operation, vehicle speed V, and so forth, as indicated in the engagement operation table of FIG. 2. In FIG. 2, "1st" to "8th" mean the first speed to the eighth speed as forward gear positions, and "Rev" means a reverse speed as a reverse gear position, and the gear ratio γ (=rotational speed Nin of the transmission input shaft/rotational speed Nout of the transmission output shaft) of the automatic transmission 16 corresponding to each gear position is determined as appropriate by each gear ratio (=the number of teeth of the sun gear/the number of teeth of the ring gear) of the first planetary gear set 36, second planetary gear set 38, and the third planetary gear set 40.

As indicated in the engagement operation table of FIG. 2, the first gear position "1st" is established when the first clutch C1 and the second brake B2 are engaged. The second gear position "2nd" is established when the first clutch C1 and the first brake B1 are engaged. The third gear position "3rd" is established when the first clutch C1 and the third clutch C3 are engaged. The fourth gear position "4th" is established when the first clutch C1 and the fourth clutch C4 are engaged. The fifth gear position "5th" is established when the first clutch C1 and the second clutch C2 are engaged. The sixth gear position "6th" is established when the second clutch C2 and the fourth clutch C4 are engaged. The seventh gear position "7th" is established when the second clutch C2 and the third clutch C3 are engaged. The eighth gear position "8th" is established when the second clutch C2 and the first brake B1 are engaged. The reverse gear position "Rev" is established when the third clutch C3 and the second brake B2 are engaged.

Figure 3:
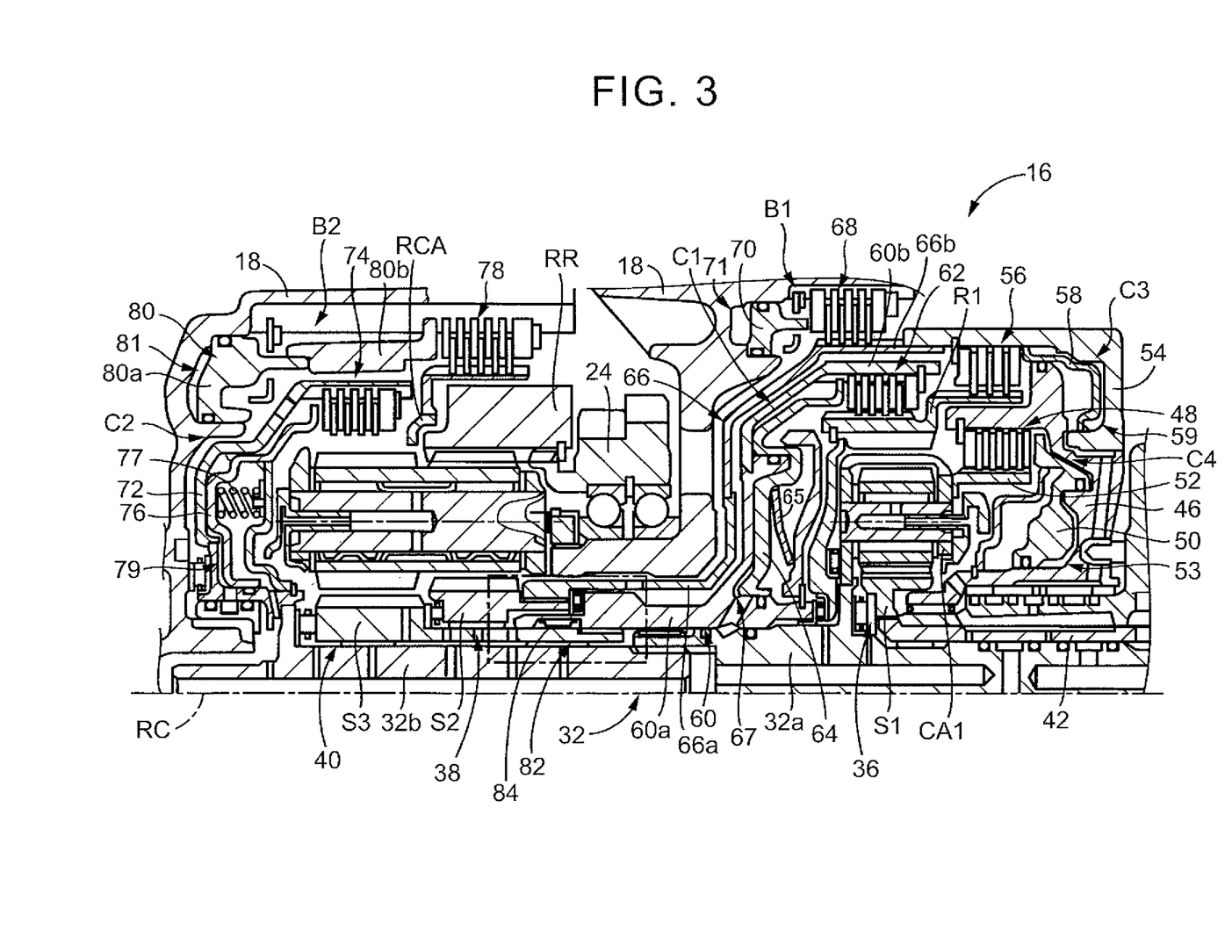
FIG. 3 is a cross-sectional view of the vehicular automatic transmission of FIG. 1.

FIG. 3 is a cross-sectional view of the automatic transmission 16 of FIG. 1. The automatic transmission 16 includes the transmission input shaft 32, transmission output shaft 24, first planetary gear set 36, second planetary gear set 38, third planetary gear set 40, first clutch C1-fourth clutch C4, first brake B1 and second brake B2, within the case 18 as a non-rotary member. The transmission input shaft 32, first planetary gear set 36 through third planetary gear set 40, first clutch C1 through fourth clutch C4, and the first brake B1 and second brake B2 are constructed generally symmetrically with respect to the axis RC; therefore, the lower halves of these components below the axis RC are not illustrated in FIG. 3.

The transmission input shaft 32 is mounted rotatably about the axis RC. The transmission input shaft 32 consists of a first rotary shaft 32a located closer to the torque converter 14 in the direction of the axis RC, and a second rotary shaft 32b. One end portion of the second rotary shaft 32b as viewed in the direction of the axis RC is spline-fitted to the first rotary shaft 32a, such that the second rotary shaft 32b rotates as a unit with the first rotary shaft 32a. One end portion of the first rotary shaft 32a closer to the torque converter 14 as viewed in the direction of the axis R is coupled to the turbine wheel 14t of the torque converter 14 such that power can be transmitted between the first rotary shaft 32a and the turbine wheel 14t.

The first planetary gear set 36, transmission output shaft 24, second planetary gear set 38, and the third planetary gear set 40 are arranged in this order, from the torque converter 14 side (the right-hand side in FIG. 3) in the direction of the axis RC.

The first planetary gear set 36 is in the form of a double-pinion-type planetary gear set. The first sun gear S1 of the first planetary gear set 36 is coupled to an intermediate member 42 that is disposed radially outward of the first rotary shaft 32a. The intermediate member 42 is coupled to the case 18 as a non-rotary member. Accordingly, the first sun gear S1 is held in a non-rotatable state. The first carrier CA1 is coupled to the fourth clutch C4. The first ring gear R1 is formed in annular shape, and a friction engagement element 62 of the first clutch C1 and a friction engagement element 56 of the third clutch C3 are provided on the radially outer side of the first ring gear R1.

The fourth clutch C4 includes a clutch drum 46, a friction engagement element 48 provided between the clutch drum 46 and the first carrier CA1, a piston 50 operable to press the friction engagement element 48, and a spring (not shown) that biases the piston 50 away from the friction engagement element 48 in the direction of the axis RC.

The clutch drum 46 is formed in a double-bottom cylindrical shape, and is mounted rotatably about the axis RC. The friction engagement element 48 that consists of a plurality of friction plates is provided between a radially outer cylindrically portion of the clutch drum 46, and a cylindrical member 52 coupled to the first carrier CA1. The piston 50 has a pressing portion formed at a position adjacent to the friction engagement element 48 as viewed in the direction of the axis RC. When the piston 50 is moved toward the friction engagement element 48 in the direction of the axis RC, the friction engagement element 48 is pressed by the piston 50, so that the fourth clutch C4 is engaged or engaged while slipping. If the fourth clutch C4 is engaged, the first carrier CA1 and the clutch drum 46 are coupled to each other. The piston 50 is controlled by means of a hydraulic pressure supplied to an oil pressure chamber 53 as an oil-tight space surrounded and formed by the piston 50 and the clutch drum 46.

The third clutch C3 includes a clutch drum 54, friction engagement element 56 provided between an outer circumferential surface of the first ring gear R1 and an inner circumferential surface of the clutch drum 54, a piston 58 operable to press the friction engagement element 56, and a spring (not shown) that biases the piston 58 away from the friction engagement element 56 in the direction of the axis RC.

The clutch drum 54 is formed in a cylindrical shape with a bottom, and is mounted rotatably about the axis RC. The friction engagement element 56 that consists of a plurality of friction plates is provided between an inner circumferential surface of a cylindrical portion of the clutch drum 54 and the outer circumferential surface of the first ring gear R1. The piston 58 has a pressing portion formed at a position adjacent to the friction engagement element 56 as viewed in the direction of the axis RC. When the piston 58 is moved toward the friction engagement element 56 in the direction of the axis RC, the friction engagement element 56 is pressed by the piston 58, so that the third clutch C3 is engaged or engaged while slipping. If the third clutch C3 is engaged, the first ring gear R1 and the clutch drum 54 are coupled to each other. The piston 58 is controlled by means of a hydraulic pressure supplied to an oil pressure chamber 59 as an oil-tight space, which is surrounded and formed by the piston 58 and the clutch drum 54.

The first clutch C1 includes a clutch drum 60, a friction engagement element 62 provided between the clutch drum 60 and the first ring gear R1, a piston 64 operable to press the friction engagement element 62, and a spring 65 that biases the friction engagement element 62 away from the friction engagement element 62 in the direction of the axis RC.

The clutch drum 60 is formed as a cylindrical member in which a small-diameter portion 60a and a large-diameter portion 60b are formed, and is mounted rotatably about the axis RC. The friction engagement element 62 that consists of a plurality of friction plates is provided between an inner circumferential surface of the large-diameter portion 60b of the clutch drum 60 and the outer circumferential surface of the first ring gear R1. The piston 64 has a pressing portion formed at a position adjacent to the friction engagement element 62 as viewed in the direction of the axis RC. When the piston 64 is moved toward the friction engagement element 62 in the direction of the axis RC, the friction engagement element 62 is pressed by the piston 64, so that the first clutch C1 is engaged or engaged while slipping. If the first clutch C1 is engaged, the clutch drum 60 and the first ring gear R1 are coupled to each other. The piston 58 is controlled by means of a hydraulic pressure supplied to an oil pressure chamber 67 as an oil-tight space, which is surrounded and formed by the piston 64 and the clutch drum 60.

The first brake B1 includes a connecting drum 66 coupled to the clutch drum 54, a friction engagement element 68 provided between the case 18 and the connecting drum 66, a piston 70 operable to press the friction engagement element 68, and a spring (not shown) that biases the piston 70 away from the friction engagement element 68 in the direction of the axis RC.

The connecting drum 66 is in the form of a cylindrical member in which a small-diameter portion 66a and a large-diameter portion 66b are formed, and is mounted rotatably about the axis RC. The friction engagement element 68 that consists of a plurality of friction plates is provided between an outer circumferential surface of the large-diameter portion 66b of the connecting drum 66, and an inner wall of the ease 18. The piston 70 has a pressing portion formed at a position adjacent to the friction engagement element 68 as viewed in the direction of the axis RC. When the piston 70 is moved toward the friction engagement element 68 in the direction of the axis RC, the friction engagement element 68 is pressed by the piston 70, so that the first brake B1 is engaged or engaged while slipping. If the first brake B1 is engaged, the connecting drum 66 and the case 18 are coupled to each other, and the connecting drum 66 stops being rotated. The piston 70 is controlled by means of a hydraulic pressure supplied to an oil pressure chamber 71 as an oil-tight space, which is surrounded and formed by the case 18 and the piston 70.

The second sun gear S2 of the second planetary gear set 38 is spline-fitted to an end portion of the cylindrical small-diameter portion 66a of the connecting drum 66. The third sun gear S3 of the third planetary gear set 40 is formed in a generally cylindrical shape, and an its end portion located closer to the torque converter 14 as viewed in the direction of the axis RC is spline-fitted to the small-diameter portion 60a of the clutch drum 60.

The common carrier RCA of the second planetary gear set 38 and the third planetary gear set 40 supports the second pinion gears P2 and the third pinion gears P3 such that pinion gears P2, P3 can rotate about themselves and rotate about the axis RC. A friction engagement element 74 of the second clutch C2 and a friction engagement element 78 of the second brake B2, which will be described later, are provided on the radially outer side of the carrier RCA. While the carrier RCA is not illustrated on the radially inner side of the friction engagement element 74 of the second clutch C2 in FIG. 3, the carrier RCA is located in another phase in the circumferential direction. The common ring gear RR of the second planetary gear set 38 and the third planetary gear set 40 are formed in an annular shape, and its radially inner portion is spline-fitted to the transmission output shaft 24.

The second clutch C2 includes a clutch drum 72, a friction engagement element 74 provided between the clutch drum 72 and the carrier RCA, a piston 76 operable to press the friction engagement element 74, and a spring 77 that biases the piston 76 away from the friction engagement element 74 in the direction of the axis RC.

The clutch drum 72 is a cylindrical member with a bottom, and is mounted rotatably about the axis RC. The friction engagement element 74 is provided between an inner circumferential surface of the clutch drum 72 and an outer circumferential surface (not shown in FIG. 3) of the carrier RCA. The piston 76 has a pressing portion formed at a position adjacent to the friction engagement element 74 as viewed in the direction of the axis RC. When the piston 76 is moved toward the friction engagement element 74 in the direction of the axis RC, the friction engagement element 74 is pressed by the piston 76, so that the second clutch C2 is engaged or engaged while slipping. If the second clutch C2 is engaged, the clutch drum 72 and the carrier RCA are coupled to each other. The piston 76 is controlled by means of a hydraulic pressure supplied to an oil pressure chamber 79 as an oil-tight space, which is surrounded and formed by the piston 76 and the clutch drum 72.

The second brake B2 includes a friction engagement element 78 provided between an outer circumferential surface of the carrier RCA and the inner wall of the case 18, a piston 80 operable to press the friction engagement element 78, and a spring (not shown) that biases the piston 80 away from the friction engagement element 78 in the direction of the axis RC.

The friction engagement element 78, which consists of a plurality of friction plates, is provided between the outer circumferential surface of the carrier RCA and the inner wall of the case 18. The piston 80 consists of a piston body 80a and an extension 80b. The extension 80b has a pressing portion formed at a position adjacent to the friction engagement element 78 as viewed in the direction of the axis RC. When the piston 80 is moved toward the friction engagement element 78 in the direction of the axis RC, the friction engagement element 78 is pressed by the piston 80, so that the second brake B2 is engaged or engaged while slipping. If the second brake B2 is engaged, the carrier RCA and the case 18 are connected to each other, and the carrier RCA stops being rotated. The piston 80 is controlled by means of a hydraulic pressure supplied to an oil pressure chamber 81 as an oil-tight space, which is surrounded and formed by the piston 80 and the case 18.

Figure 4:
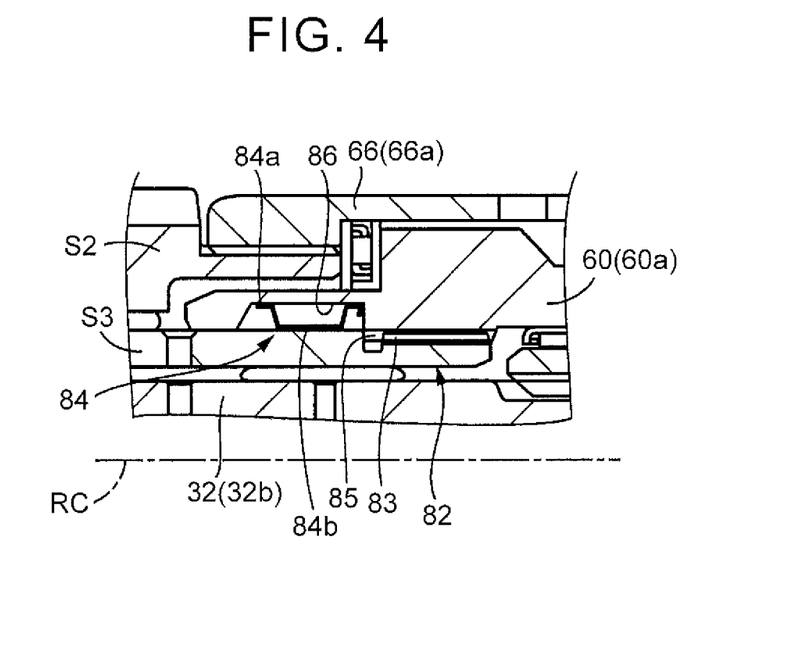
FIG. 4 is an enlarged view of a portion surrounded by a one-dot chain line in the cross-sectional view of FIG. 3.

FIG. 4 is an enlarged view of a portion surrounded by a one-dot chain line in FIG. 3. As shown in FIG. 4, the transmission input shaft 32 is mounted about the axis RC as its center, and the third sun gear S3 of the third planetary gear set 40 is disposed on the radially outer side of the transmission input shaft 32. The clutch drum 60 that constitutes the first clutch C1 is disposed on the radially outer side of the third sun gear S3.

Spline teeth 83 are formed in an outer circumferential surface of a portion of the third sun gear S3 located closer to the torque converter 14 (a right-hand side portion in FIG. 4) in the direction of the axis RC. Also, spline teeth 85 are formed in an inner circumferential surface of a portion of the clutch drum 60 which overlaps the spline teeth 83 of the third sun gear S3 as viewed in radial directions. The spline teeth 83 of the third sun gear S3 and the spline teeth 85 of the clutch drum 60 are in engagement with each other, so that a spline engagement portion 82 is formed which couples the third sun gear S3 and the clutch drum 60, such that these components cannot rotate relative to each other (though relative rotation via backlash takes place), but can move relative to each other in the direction of the axis RC.

A tolerance ring 84 is mounted at a position adjacent to the engagement position of the spline teeth 83 and spline teeth 83 that constitute the spline engagement portion 82 (i.e., a portion different from the spline engagement portion 82), to be located in a portion where the third sun gear S3 and the clutch drum 60 overlap each other as viewed in radial directions, such that the tolerance ring 84 is in contact with both the third sun gear S3 and the clutch drum 60. An annular groove 86 is formed in an inner circumferential surface of the clutch drum 60, and the tolerance ring 84 is disposed in an annular space formed by the annular groove 86.

The tolerance ring 84 has a ring-shaped annular portion 84a, and a plurality of protrusions 84b that rise radially inward from the annular portion 84a. The annular portion 84a of the tolerance ring 84 is in abutting contact with the clutch drum 60, and the protrusions 84b are in abutting contact with the third sun gear S3, thus causing sliding resistance to be produced between the third sun gear S3 and the clutch drum 60. Namely, the tolerance ring 84 restricts relative rotation, which is permitted in a range of backlash formed in the direction of rotation between the spline teeth 83 of the third sun gear S3 and the spline teeth 85 of the clutch drum 60. In other words, since relative rotation is restricted in the spline engagement portion 82, the backlash formed in the rotational direction of the spline engagement portion 82 between the spline teeth 83 of the third sun gear S3 and the spline teeth 85 of the clutch drum 60 appears to be eliminated When a given gear position (e.g., the eighth gear position 8th) is established in the automatic transmission 16 constructed as described above, a rotating body that includes the spline engagement portion 82 and is not involved in power transmission is formed. Namely, the rotating body is co-rotated with other parts with no torque transmitted thereto. This rotating body is co-rotated due to meshing of gears, though no torque is transmitted to the rotating body. For example, when the eighth gear position 8th is established, the second clutch C2 and the first brake B1 are engaged, and other friction engagement devices are released.

Figure 5:
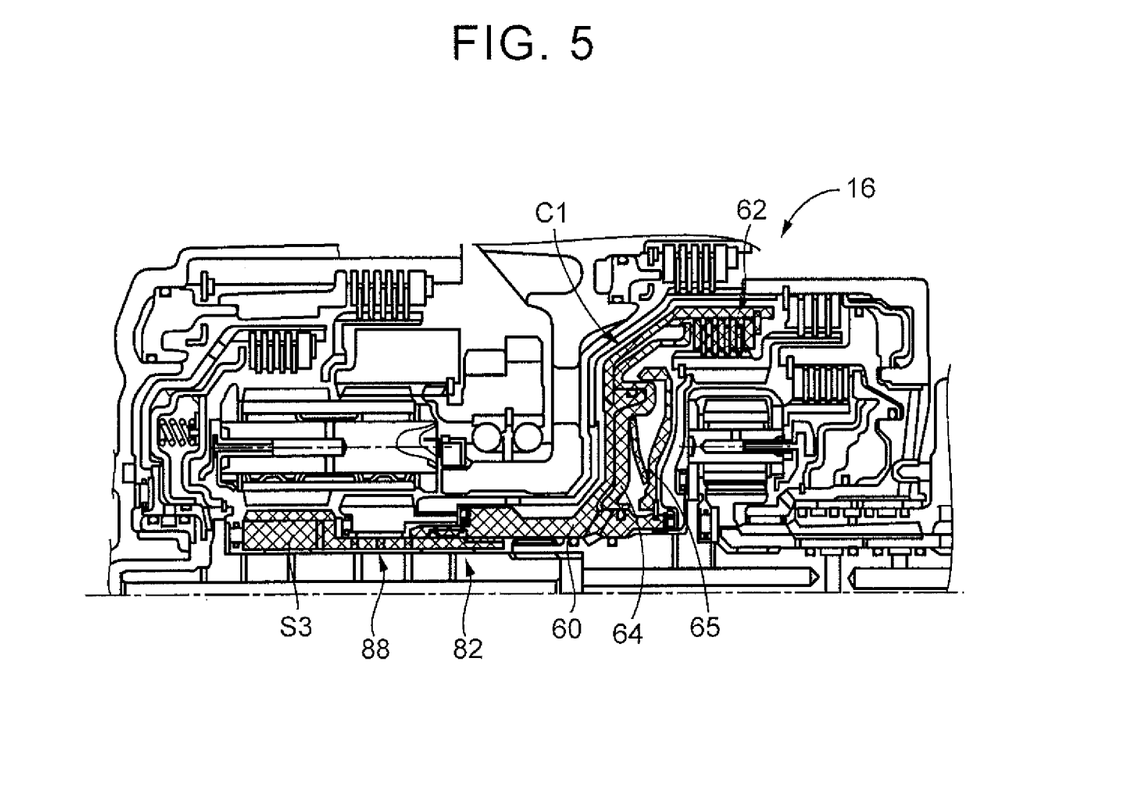
FIG. 5 is a view showing a rotating body to which torque is not transmitted when the eighth gear position is established.

At this time, a hatched region in the cross-sectional view of the automatic transmission 16 shown in FIG. 5 is co-rotated with other parts without transmitting torque. The hatched region corresponds to the rotating body 88 that is co-rotated with no torque transmitted thereto in the eighth gear position 8th. The rotating body 88 consists of the third sun gear S3 and rotating members (clutch drum 60, friction engagement element 62, piston 64, spring 65, etc.) that constitute the first clutch C1. The rotating body 88 also includes the spline engagement portion 82 inserted between the sun gear S3 and the clutch drum 60.

Since the third sun gear S3 and the third pinion gears P3 mesh with each other, the third sun gear S3 is co-rotated in accordance with rotation of the third pinion gears P3. Also, the clutch drum 60 of the first clutch C1 that is in spline engagement with the third sun gear S3, and the hatched rotating members (such as the piston 64) that constitute the first clutch C1 are also co-rotated. Since the first clutch C1 is released in the eighth gear position 8th, friction plates of the friction engagement element 62 of the first clutch C1, which plates are in spline engagement with the clutch drum 60, are co-rotated along with the clutch drum 60.

Figure 6:
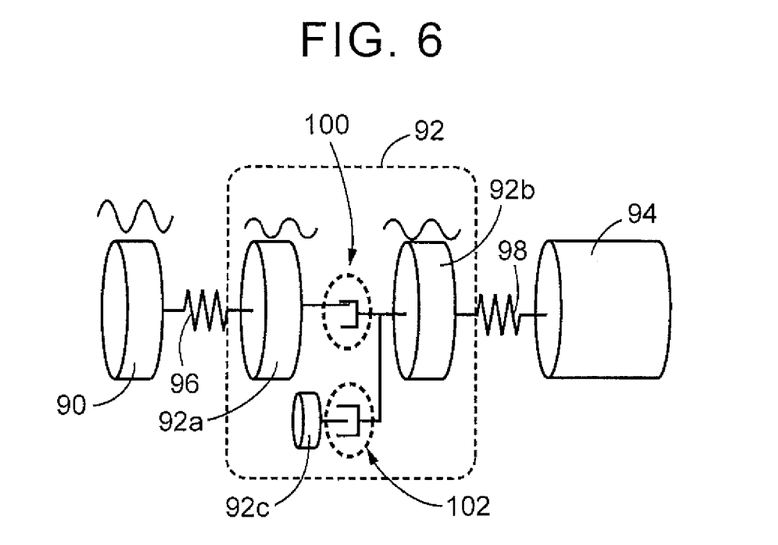
FIG. 6 is a vibration model of the vehicular drive train, which takes account of backlash formed in the automatic transmission, when the transmission receives torque fluctuation from an engine.

An effect provided by forming the rotating body 88 that is rotated with no torque transmitted thereto, when a given gear position, such as the eighth gear position 8th, is established, in the automatic transmission 16, will be described. FIG. 6 is a vibration model of the vehicular drive train 10, which takes account of backlash formed in the automatic transmission 16, when the transmission 16 receives torque fluctuation from the engine 12.

In FIG. 6, reference numeral 90 denotes an inertial body (which will be referred to as "inertial body 90") corresponding to the engine 12, and reference numeral 92 denotes an inertial body (which will be referred to as "inertial body 92") corresponding to the automatic transmission 16, while reference numeral 94 denotes an inertial body (which will be referred to as "inertial body 94") that constitutes a power transmission path from the transmission output shaft 24 to drive wheels (not shown). The inertial body 90 has an inertial mass of rotating members of the engine 12, and the inertial body 92 has an inertial mass of rotating members of the automatic transmission 16, while the inertial body 94 has a total value of respective inertial masses of rotating members that form the power transmission path from the transmission output shaft 24 to the drive wheels (not shown). A spring 96 as a vibration model is inserted between the inertial body 90 and the inertial body 92, and a spring 98 as a vibration model is inserted between the inertial body 92 and the inertial body 94.

In the automatic transmission 16, backlash is formed in meshing portions of various gears and spline engagement portions. If this is modeled, the inertial body 92 is divided into three inertial bodies, i.e., a first inertial body 92a, a second inertial body 92b, and a third inertial body 92c, as shown in FIG. 6. The first inertial body 92a and the second inertial body 92b are inertial bodies to which torque is transmitted when a given gear position, such as the eighth gear position 8th, is established. The third inertial body 92c is an inertial body to which no torque is transmitted when the given gear position is established. The first inertial body 92a and the second inertial body 92b correspond to rotating members (excluding the case 18, etc.) that are not hatched in FIG. 5, in the case where the eighth gear position 8th is established. The third inertial body 92c corresponds to rotating members (i.e., the rotating body 88) that are hatched in FIG. 5, in the case where the eighth gear position 8th is established.

A first backlash 100 is set between the first inertial body 92a and the second inertial body 92b. The first backlash 100 is provided by modeling all backlashes formed on a power transmission path through which torque is transmitted when a given gear position is established, as one backlash. A second backlash 102 is set between the second inertial body 92b and the third inertial body 92c. The second backlash 102 is provided by modeling all backlashes formed between rotating members that are co-rotated with no torque transmitted thereto when a given gear position is established, as one backlash.

Figure 7A:
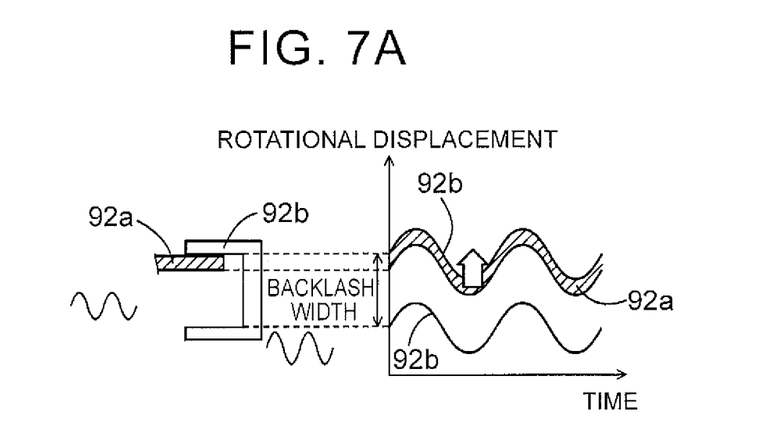
FIG. 7A is a view showing an image of first backlash of FIG. 6.
Figure 7B:
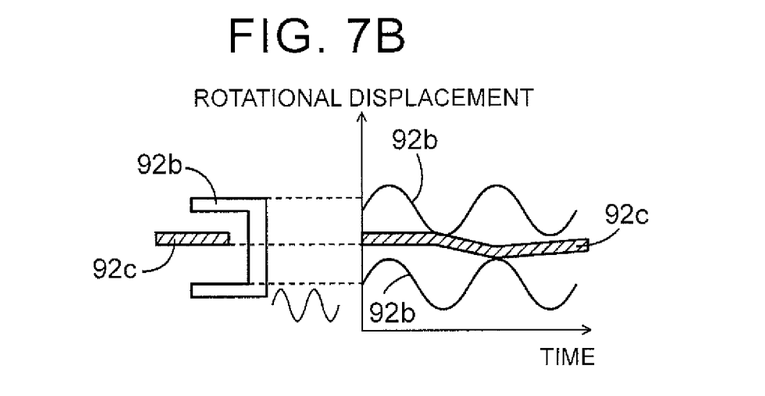
FIG. 7B is a view showing an image of second backlash of FIG. 6.

FIG. 7A shows an image of the first backlash 100 of FIG. 6, and FIG. 7B shows an image of the second backlash 102 of FIG. 6. The left-hand section of FIG. 7A shows an image of backlash formed between the first inertial body 92a and the second inertial body 92b, and the right-hand section of FIG. 7A shows the relationship between the rotational displacement (rotation fluctuation) at the first backlash 100, and time, when torque fluctuation is transmitted from the engine 12. In the left-hand section of FIG. 7A, a hatched region corresponds to the first inertial body 92a, and a two-pronged region corresponds to the second inertial body 92b. A gap formed between two prongs of the two-pronged region corresponds to the width of backlash formed between the first inertial body 92a and the second inertial body 92b, in other words, backlash (total value) formed between rotating members through which torque is transmitted in the case where a given gear position is established. The first inertial body 92a is inserted within the backlash region such that it can move relative to the second inertial body 92b.

In FIG. 7A, since torque is transmitted between the first inertial body 92a and the second inertial body 92b, torque is also transmitted via the first backlash 100. Accordingly, as shown in FIG. 7A, the first inertial body 92a is placed in a state where it is pressed against one (drive side) of the two prongs of the second inertial body 92b. Namely, the backlash is closed up on the drive side, between the first inertial body 92a and the second inertial body 92b.

The right-hand section of FIG. 7A indicates the relationship between the rotational displacement at the first backlash 100 when torque fluctuation of the engine 12 is transmitted, and time. The rotational displacement on the vertical axis is obtained by extracting only the rotational displacement (rotation fluctuation) due to torque fluctuation of the engine 12. The top wavy line and bottom wavy line in the right-hand section of FIG. 7A indicate the respective rotational displacements of the two prongs of the second inertial body 92b as indicated in the left-hand section of FIG. 7A. As shown in FIG. 7A, the second inertial body 92b oscillates up and down with time due to torque fluctuation of the engine 12. A hatched region in the right-hand section of FIG. 7A indicates the first inertial body 92a shown in the left-hand section of FIG. 7A, and the first inertial body 92a is pressed against a wall on the upper side (drive side) of the second inertial body 92b. Thus, in the first backlash 100, the first inertial body 92a is constantly pressed against the wall on the upper side (drive side) of the second inertial body 92b, due to the torque transmission, and the first and second inertial bodies 92a, 92b do not move relative to each other, within the backlash width of the second inertial body 92b.

Next, FIG. 7B will be described. The left-hand section of FIG. 7B shows an image of backlash formed between the second inertial body 92b and the third inertial body 92c. The right-hand section of FIG. 7B indicates the relationship between the rotational displacement (rotation fluctuation) at the second backlash 102, and time, when torque fluctuation is transmitted from the engine 12. In the left-hand section of FIG. 7B, a hatched region corresponds to the third inertial body 92c, and a two-pronged region corresponds to the second inertial body 92b. A gap formed between the two prongs of the second inertial body 92b corresponds to the width of backlash formed between the second inertial body 92b and the third inertial body 92c, in other words, backlash (total value) formed between rotating members to which torque is not transmitted in a given gear position. The third inertial body 92c is inserted within the backlash width such that it can rotate relative to the second inertial body 92b.

In FIG. 7B, since torque is not transmitted between the second inertial body 92b and the third inertial body 92c, the third inertial body 92c can freely move (freely rotate) within the range of the backlash of the second inertial body 92b. Accordingly, as shown in the left-hand section of FIG. 7B, the third inertial body 92c freely moves (freely rotate) within the range of the backlash of the second inertia body 92b.

The right-hand section of FIG. 7B indicates the relationship between the rotational displacement (rotation fluctuation) at the second backlash 102 when torque fluctuation of the engine 12 is transmitted, and time. The rotational displacement on the vertical axis is obtained by extracting only the rotational displacement (rotation fluctuation) due to the torque fluctuation of the engine 12. In the right-hand section of FIG. 7B, the top wavy line and the bottom wavy line indicate the respective rotational displacements of the two prongs of the second inertial body 92b shown in the left-hand section of FIG. 7B. As shown in FIG. 7B, the second inertial body 92b oscillates up and down with time due to the torque fluctuation of the engine 12. A hatched region in the left-hand section of FIG. 7B indicates the third inertial body 92c shown in the left-hand section of FIG. 7B. As shown in the right-hand section of FIG. 7B, the third inertial body 92c moves (freely rotates) within the range of the backlash while colliding with the upper and lower walls of the second inertial body 92b with time.

Figure 8A:
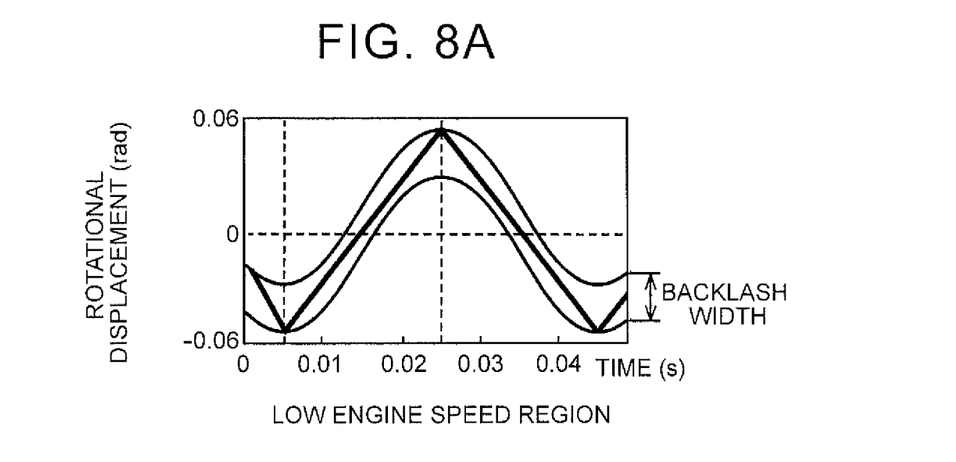
FIG. 8A shows the relationship between the phase angle displacement at the second backlash of FIG. 6 and time, in a low engine speed region.
Figure 8B:
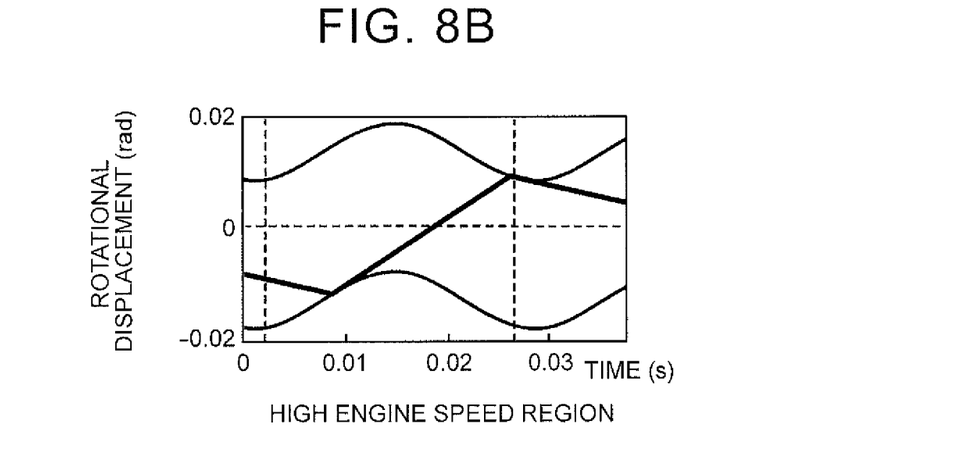
FIG. 8B shows the relationship between the phase angle displacement at the second backlash of FIG. 6 and time, in a high engine speed region.

FIG. 8A and FIG. 8B indicate the relationship between the rotational displacements of the second inertial body 92b and the third inertial body 92c when torque fluctuation of the engine 12 is transmitted, and time. FIG. 8A shows a condition in a low engine speed region, and FIG. 8B shows a condition in a high engine speed region. Two wavy lines shown in FIG. 8A and FIG. 8B show the rotational displacements of the two prongs of the second inertial body 92b shown in FIG. 7B, and a gap between the two wavy lines indicates backlash (backlash width). The rotational displacement of FIG. 8A and FIG. 8B is obtained by retrieving only the displacement component caused by torque fluctuation of the engine 12, and a rotational displacement that is equal to zero corresponds to a displacement at the time when torque fluctuation is not transmitted. As shown in FIG. 8A and FIG. 8B, the rotational displacement of the second inertial body 92b varies up and down (in a wavelike fashion) with time due to torque fluctuation of the engine 12.

Also, a broken line drawn between the two wavy lines (in the backlash width of the second inertial body 92b) indicates the rotational displacement of the third inertial body 92c. As shown in FIG. 8A, the third inertial body 92c moves (freely rotates) within the backlash width while colliding with the second inertial body 92b with time. This situation will be explained with reference to the automatic transmission 16 of FIG. 5. In the case where the eighth gear position 8th is established, the rotating body 88 (corresponding to the third inertial body 92c) to which torque is not transmitted and which is subjected to hatching is co-rotated along with other rotating members, while colliding with gear teeth and spline teeth that define backlash in the rotating body 88. More specifically, the backlash formed in the rotating body 88 includes gear backlash foamed between the third sun gear S3 and the clutch drum 60 and spline backlash formed in the spline engagement portion 82.

Figure 9:
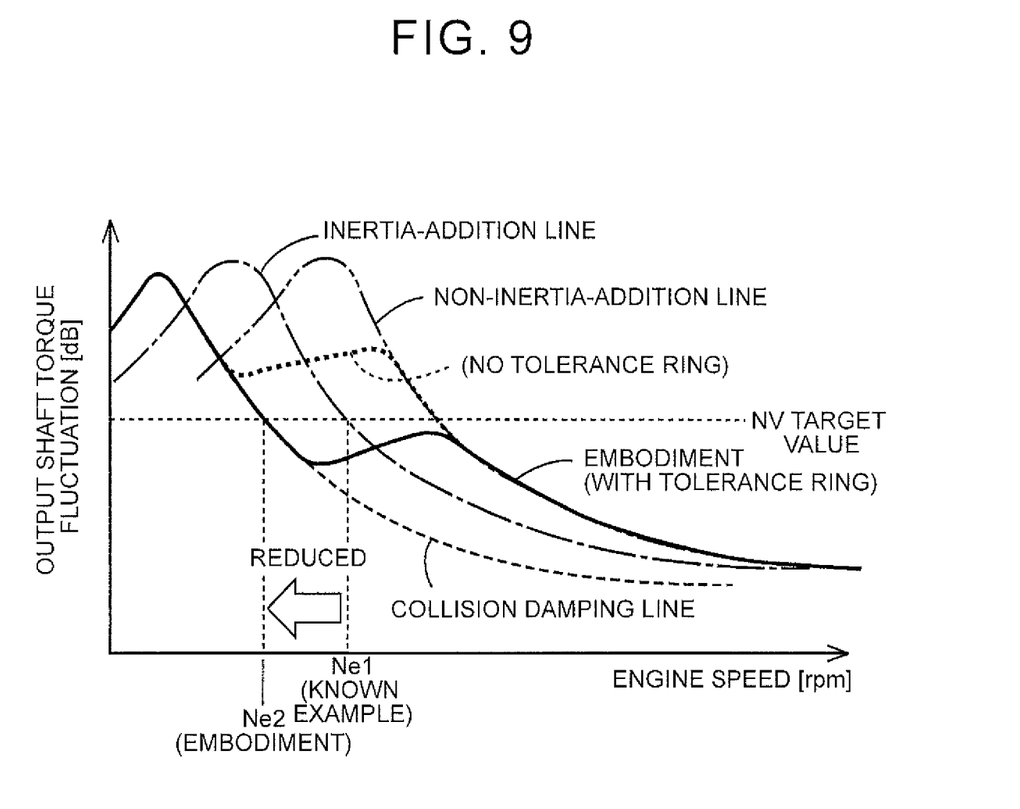
FIG. 9 shows the relationship between the engine speed and output shaft torque fluctuation.

As described above, when the eighth gear position 8th is established in the automatic transmission 16, the rotating body 88 is co-rotated while colliding with gear teeth that define gear backlash between the third sun gear S3 and the clutch drum 60 and spline teeth that define spline backlash in the spline engagement portion 82. Some effects provided by this arrangement will be described. FIG. 9 shows the relationship between the engine speed [rpm] and the output shaft torque fluctuation [dB]. Here, the output shaft torque fluctuation indicates the magnitude of torque fluctuation delivered from the transmission output shaft 24 of the automatic transmission 16, when torque fluctuation of the engine 12 is transmitted to the automatic transmission 16. A collision damping line indicated by a dashed line indicates the magnitude of output shaft torque fluctuation when the rotating body 88 is co-rotated while colliding with gear teeth that define gear backlash between the third sun gear S3 and the clutch drum 60 and spline teeth that define spline backlash in the spline engagement portion 82. An inertia-addition line indicated by a one-dot chain line indicates the magnitude of output shaft torque fluctuation when the rotating body 88 is rotated integrally with the rotating members to which torque is transmitted. Namely, the inertia-addition line indicates the magnitude of output shaft torque fluctuation when the inertial mass of the rotating body 88 is added to the inertial mass of the rotating members to which torque is transmitted. A non-inertia-addition line indicated by a two-dot chain line indicates the magnitude of output shaft torque fluctuation when the rotating body 88 is co-rotated without colliding with gear teeth defining gear backlash between the third sun gear S3 and the clutch drum 60, and spline teeth defining spline backlash in the spline engagement portion 82. Namely, the non-inertia-addition line indicates the magnitude of output shaft torque fluctuation when the inertial mass of the rotating body 88 is not added at all to the rotating members to which torque is transmitted. All of the collision damping line, inertia-addition line, and the non-inertia-addition line are analytically obtained.

On the non-inertia-addition line indicated by the two-dot chain line, the peak of the output shaft torque fluctuation appears in a relatively high engine speed region, and the magnitude of the output shaft torque fluctuation is reduced as the engine speed increases. The output shaft torque fluctuation is reduced as the engine speed increases, because torque fluctuation of the engine 12 is reduced as the engine speed increases. On the inertia-addition line indicated by the one-dot chain line, the peak of the output shaft torque fluctuation appears in a lower engine speed region than that of the non-inertia-addition line, and the magnitude of the output shaft torque fluctuation is reduced as the engine speed increases. It follows that, when the engine speed is in a relatively high region, the output shaft torque fluctuation is smaller on the inertia-addition line than that on the non-inertia-addition line. This is because, on the inertia-addition line, the inertia of the rotating body 88 is added.

On the collision damping line indicated by the dashed line, the peak of the output shaft torque fluctuation appears in a further lower engine speed region than that on the inertia-addition line, and the magnitude of the output shaft torque fluctuation is reduced as the engine speed increases. Thus, the output shaft torque fluctuation becomes smaller on the collision damping line than that on the inertia-addition line, when the engine speed becomes equal to or higher than a predetermined value (e.g., the lower limit of the rotational speed region during traveling of the vehicle).

The solid line shown in FIG. 9 indicates the magnitude of the output shaft torque fluctuation of this embodiment. When the engine 12 is in a low rotational speed region, torque fluctuation of the engine 12 is large; therefore, the magnitude of output shaft torque fluctuation changes according to the collision damping line. Namely, the rotating body 88 is co-rotated while colliding with teeth faces defining backlash (gear backlash and spline backlash).

Thus, the hatched region in FIG. 5 is co-rotated while repeatedly colliding with gear teeth defining gear backlash between the third sun gear S3 and the clutch drum 60, and spline teeth defining spline backlash in the spline engagement portion 82, so that the hatched region appears to be substantially connected to the rotating members that are not subjected to hatching. Namely, the inertial mass of the rotating members that are subjected to hatching is regarded as being added. In other words, it can be regarded as the inertia-addition line of FIG. 9. Furthermore, since the rotating body 88 is co-rotated while colliding with gear teeth defining gear backlash and spline teeth defining spline backlash, a part of the inertia energy produced by torque fluctuation is consumed through the collision, and the output shaft torque fluctuation is further reduced. Accordingly, the output shaft torque fluctuation is further smaller on the collision damping line, than that on the inertia-addition line, as shown in FIG. 9. Thus, as in the case where the eighth gear position 8th is established, for example, the rotating body 88 that does not contribute to torque transmission oscillates while colliding with teeth faces defining backlash (gear backlash and spline backlash), so that the output shaft torque fluctuation can be reduced. In this connection, the engine speed at which the output shaft torque fluctuation becomes equal to or smaller than a preset NV target value (noise-vibration target value) shown in FIG. 9 can be reduced as compared with that of the inertia-addition line.

Suppose the case where the lockup clutch 15 is set to be engaged in an engine speed range that is equal to or lower than the NV target value. If the lockup clutch 15 is engaged, the engine output can be directly transmitted to the drive wheels, so that the fuel economy is improved. On the other hand, the NV performance is likely to be deteriorated, since torque fluctuation of the engine 12, which deteriorates the NV performance, is also directly transmitted. In this embodiment in which torque fluctuation transmitted to the output shaft 24 is reduced, even if the lockup clutch 15 is engaged at a lower engine speed than that of a known counterpart, the NV performance equivalent to that of the known counterpart can be obtained. Accordingly, the lower limit of the operating region of the lockup clutch 15 can be reduced from the engine speed Ne1 (known example) to the engine speed Ne2 (this embodiment). As a result, the vehicle can travel in an extended region with the lockup clutch 15 engaged, which leads to improvement of the fuel economy.

Also, as shown in FIG. 9, as the engine speed increases, the output shaft torque fluctuation shifts from the collision damping line to the non-inertia-addition line. This is because, as the engine speed increases, the torque fluctuation is reduced, and no collision with gear teeth and spline teeth defining backlash takes place. Namely, as shown in FIG. 8B, as the engine speed increases, the rotational displacement is reduced as the torque fluctuation of the engine is reduced. With the rotational displacement thus reduced, the rotating body 88 subjected to hatching in FIG. 5, which does not contribute to torque transmission, becomes less likely to collide with tooth faces defining backlash. Accordingly, as the engine speed increases, the output shaft torque fluctuation shifts from the collision damping line indicated by the dashed line in FIG. 9, to the non-inertia-addition line indicated by the two-dot chain line.

As described above, since the torque fluctuation of the engine 12 is reduced as the engine speed increases, the number (frequency) of collisions with gear teeth and spline teeth that define gear backlash and spline backlash in the rotating body 88 that does not contribute to torque transmission is reduced, and almost no collisions are observed in a high engine speed region. Namely, the output shaft torque fluctuation shifts to the non-inertia-addition line. In FIG. 9, if the shifting from the collision damping line to the non-inertia-addition line occurs while the engine 12 is in a low rotational speed region, the shifting may occur in a region where the output shaft torque fluctuation is large, and exceeds the NV target value, as indicated by a dashed line. In this case, the effect of damping the output shaft torque fluctuation, which effect is obtained on the collision damping line, can hardly be obtained, and the output shaft torque fluctuation becomes large.

To solve the above problem, a tolerance ring 84 is additionally provided in the spline engagement portion 82, so that the automatic transmission 16 operates according to the collision damping line until the engine reaches a given rotational speed region, If the tolerance ring 84 is inserted between the third sun gear S3 and the clutch drum 60, backlash between the third sun gear S3 and the clutch drum 60 becomes substantially equal to zero. Accordingly, the backlash (total value) formed on the power transmission path consists solely of the first backlash 100. Since the first backlash 100 is formed between tooth faces of meshing gears, it is sufficiently smaller than the second backlash 102 of FIG. 6. Thus, since the backlash on the power transmission path can be regarded as only the backlash formed by the first backlash 100, the backlash appears to be small. With the backlash thus reduced, the frequency of collisions that occur at the backlash is increased as compared with the case where the tolerance ring 84 is not provided. As a result, the engine speed at which the output shaft torque fluctuation shifts from the collision damping line to the non-inertia-addition line can be moved to the higher speed side. With the tolerance ring 84 thus provided, collisions are more likely to occur at the backlash. Accordingly, the engine speed at which the output shaft torque fluctuation shifts from the collision damping line to the non-inertia-addition line becomes higher, and the engine speed at which the output shaft torque fluctuation becomes equal to or smaller than the NV target value can be moved to the lower engine speed side. Thus, the operating region of the lockup clutch can be moved to the lower engine speed side, and the fuel economy can be improved. In the low speed region of the engine 12, the output shaft torque fluctuation varies along the collision damping line even if the tolerance ring 84 is provided, because the torque fluctuation of the engine 12 is large in the low speed region of the engine 12, and slipping occurs to the tolerance ring 84.

While the case where the eighth gear position 8th is established in the automatic transmission 16 has been described as one example, substantially the same effects can be obtained in other gear positions, since a rotating body through which torque is not transmitted is similarly formed when other gear positions are established.

As described above, according to this embodiment, when the eighth gear position 8th is established in the automatic transmission 16, for example, the rotating body 88 to which torque is not transmitted is co-rotated by rotating members to which torque is transmitted. At this time, the rotating body 88, which has the spline engagement portion 82, rotates while colliding with spline teeth between which spline backlash is formed in the rotational direction in the spline engagement portion 82. In a low engine speed region, collisions are repeated in the spline engagement portion 82, since the varying displacement of the spline engagement portion due to torque fluctuation of the engine 12 is large. The energy of inertia produced by torque fluctuation of the engine 12 is consumed due to the collisions, so that the torque fluctuation delivered from the transmission output shaft 24 of the automatic transmission 16 can be suppressed or reduced. Also, in order to suppress or reduce torque fluctuation, there is no need to add a new component, such as an inertia member, for suppressing the torque fluctuation.

Also, in this embodiment, as the rotational speed of the engine 12 increases, the varying displacement of the spline engagement portion 82 is reduced, and collisions are less likely to occur in the spline engagement portion 82. Accordingly, the effect of cancelling torque fluctuation by use of collisions is reduced. In this embodiment, the tolerance ring 84 is provided, so that the backlash in the spline engagement portion 82 becomes substantially equal to zero. Accordingly, the backlash formed on the power transmission path consists solely of backlash formed at meshing parts of gears; therefore, the backlash is sufficiently reduced. As a result, the frequency of collisions at the backlash increases even when the engine speed increases, and torque fluctuation can be suppressed, through consumption of the inertia energy by the collisions.

While one embodiment of the present disclosure has been described in detail with reference to the drawings, the present disclosure may be applied in other forms.

In the above-described embodiment, the tolerance ring 84 is inserted between the third sun gear S3 and the clutch drum 60. However, any member, such as an O ring, other than the tolerance ring 84 may be employed provided that it can produce sliding resistance between the third sun gear S3 and the clutch drum 60. Also, the third sun gear S3 and the clutch drum 60 may be press-fitted, in place of the tolerance ring 84, so as to reduce or eliminate backlash in the spline engagement portion 82.

While the automatic transmission 16 of the above-described embodiment is a multi-speed transmission having eight forward speeds, the coupling arrangement of the automatic transmission is not limited to that of this embodiment. This present disclosure may be applied as appropriate to any arrangement in which a rotating body through which torque is not transmitted is formed when the transmission is in a given gear position.

While the spline engagement portion 82 is provided between the third sun gear S3 and the clutch drum 60 of the first clutch C1 in the above-described embodiment, it is not necessarily provided between the third sun gear S3 and the clutch drum 60, but may be provided between a rotating element that constitutes a planetary gear set and a rotating element that constitutes another planetary gear set. Namely, a spline engagement portion may be provided as needed provided that it is provided in a rotating body through which torque is not transmitted in a given gear position.

While the tolerance ring 84 is provided in the annular groove formed in the clutch drum 60 in the above-described embodiment, it may be provided on the third sun gear S3 side.

It is to be understood that what has been described above is merely one embodiment of the present disclosure, and that the present disclosure can be carried out with various changes and improvements, based on the knowledge of those skilled in the art.

What is claimed is:

1. A vehicular automatic transmission comprising:
a plurality of engagement devices configured to realize a plurality of gear positions of the vehicular automatic transmission, according to a combination of engaged and released states of the plurality of engagement devices;
a plurality of planetary gear sets, each of the planetary gear sets including rotating elements; and
a tolerance ring, wherein:
spline teeth provided on at least one of the rotating elements of one of the plurality of planetary gear sets are engaged with spline teeth provided on one of the rotating elements of another planetary gear set or spline teeth provided on one of rotating elements of one of the engagement devices, such that a spline engagement portion is formed
the at least one of the rotating elements of the one of the plurality of planetary gear sets is coupled to the one of the rotating elements of the another planetary gear set or the one of the rotating elements of the one of the engagement devices via the spline engagement portion, so as to rotate relative to each other in a range of backlash between the spline teeth provided on the at least one of the rotating elements of the one of the plurality of planetary gear sets and the spline teeth provided on the one of the rotating elements of the another planetary gear set or the spline teeth provided on the one of the rotating elements of the one of the engagement devices,
each of the rotating elements other than the at least one of the rotating elements coupled via the spline engagement portion is coupled to another rotating element or a non-rotary member directly or via one of the engagement devices,
the at least one of the rotating elements coupled via the spline engagement portion and the spline engagement portion is configured to be co-rotated with no torque transmitted via the spline engagement portion, when the automatic transmission is placed in a predetermined gear position as one of the plurality of gear positions,
the at least one of the rotating elements coupled via the spline engagement portion overlaps a part of the one of the rotating elements of the another planetary gear set or the one of the rotating elements of the one of the engagement devices, as viewed in a radial direction of the vehicular automatic transmission,
the tolerance ring is mounted in a portion different from the spline engagement portion, such that the tolerance ring is in contact with the at least one of the rotating elements coupled via the spline engagement portion, and the one of the rotating elements of the another planetary gear set or the one of the rotating elements of the one of the engagement devices,
the predetermined gear position is configured such that the spline teeth collide with each other in the range of the backlash so as to reduce a torque fluctuation of an output shaft, and
the tolerance ring is configured to reduce the backlash in the spline engagement portion to substantially zero in a high engine speed region where an engine speed is higher than a predetermined engine speed, and the tolerance ring is configured such that slipping occurs in the tolerance ring in a low engine speed region where the engine speed is lower than a predetermined engine speed.

* * * * *